(12) United States Patent
Chung et al.

(10) Patent No.: US 7,213,943 B2
(45) Date of Patent: May 8, 2007

(54) TAP SENSING LAMP SWITCH

(75) Inventors: Peng Kuo Chung, Chung Ho (TW); Chen Yang Chun, Chung Ho (TW)

(73) Assignee: Fun Plus Corp, S. El Monte, CA (US)

( * ) Notice: Subject to any disclaimer, the term of this patent is extended or adjusted under 35 U.S.C. 154(b) by 108 days.

(21) Appl. No.: 11/216,855

(22) Filed: Aug. 31, 2005

(65) Prior Publication Data

US 2007/0045089 A1   Mar. 1, 2007

(51) Int. Cl.
*F21V 23/04* (2006.01)

(52) U.S. Cl. .................... 362/276; 362/86; 362/383; 362/395; 362/410; 362/802

(58) Field of Classification Search ............... 362/86, 362/276, 383, 394–395, 410, 802
See application file for complete search history.

(56) References Cited

U.S. PATENT DOCUMENTS

| | | | | |
|---|---|---|---|---|
| 4,103,294 A | * | 7/1978 | Stettner et al. | 367/136 |
| 6,042,242 A | * | 3/2000 | Chang | 362/86 |
| 6,561,672 B2 | * | 5/2003 | Lessard | 362/234 |
| 6,703,786 B2 | * | 3/2004 | Tannenbaum | 315/149 |
| 6,746,131 B1 | * | 6/2004 | Goldstein et al. | 362/96 |

FOREIGN PATENT DOCUMENTS

JP   2004186123 A   * 7/2004

* cited by examiner

*Primary Examiner*—Sandra O'Shea
*Assistant Examiner*—Jason Moon Han
(74) *Attorney, Agent, or Firm*—Clement Cheng, Esq.

(57) ABSTRACT

An improved startup device for controlling energization of a lamp has a base, stand coupled with the base and an illuminator connected to an electric power source. The base has a sound-collecting element mated with a housing unit so that the sound-collecting element has direct contact with the surface it is placed on. A control unit is situated within the housing unit and includes a connected startup circuit built on a circuit board, a reception element and a power-supply component. Thus, the reception element cooperates with said sound-collecting element to switch the power-supply component allowing the illuminator to make or break connection with the power source upon receiving tapping sound at the stand or through the surface. In practice, the startup device of the present invention employed in lamps affects to extend the conventional switch size to the entire floor or table area, which advantageously acts as a medium of transmitting tapping sounds to ease the task of lighting up.

12 Claims, 4 Drawing Sheets

TAP SENSING LAMP SWITCH

BACKGROUND OF THE INVENTION

A. Field of the Invention

The present invention relates to an electric switch device, and more particularly to a sensing switch structure for a lamp that can switch automatically on or off by tapping the floor where the lamp stands.

B. Description of the Prior Art

Conventional lamps consist of a lamp stand, a lamp base on top of the lamp stand, a light bulb or other illuminator installed on the lamp base, and a cover over the lamp stand. The lamp base may include a press switch, which connects with external circuit through an electric socket and receives power supplies from external source. Through the press switch the light bulb is turned on or off.

Through the press switch we can make or break connection with external power source and switch on or off the light bulb of the traditional lamp. This process requires manual handling of the power switch. But when the user enters a darkened room, he/she needs to find his/her way to the switch of the lamp in darkness before turning it on which is very inconvenient. Then there is a touch-sensitive electrical switch to turn on the light. But static of human body results in electrical shock or poor startup especially in dry places and conditions.

U.S. Pat. No. 5,493,618 to Stevens et al. suggests switch activations in response to different acoustic signals in a situation where multiple controls of appliances are desired. The patent lends efforts to distinguish air-transmitted sound of designated number of claps of the user and respond by activating the corresponding one or more appliances.

However, it does neither suggest using normal tables as a tapping medium in controlling an appliance nor that the table can be tapped to transmit a signal for pick up by a microphone installed in a lamp to control the energization thereof.

SUMMARY OF THE INVENTION

The main purpose of this invention is to resolve the shortcomings mentioned above. It allows users to tap on the surface on which the lamp is placed, and the sound-collecting element in conjunction with the reception element will translate the tapping into a signal to start up, regulate or break the circuit, and turn on or off the illuminator of the lamp. To attain the objective mentioned above, this device involves improvement of the start structure of lamps. It includes a base that connects with the framework of the lamp. The base consists of a housing unit. At one end of the housing unit is a sound-collecting element that has direct contact with the surface it is placed on, as well as a control unit situated within the housing unit. The control unit includes a connected startup circuit built on a circuit board, a reception element and the power-supply component. The reception element is adjacent to the sound-collecting element mentioned above. The power-supply component allows the illuminator to make connection with external power source.

The invention will be described for the purposes of illustration only in connection with certain illustrated embodiments; however, it is recognized that those persons skilled in the art may make various modifications, changes and additions to the illustrated embodiments without departing from the spirit and scope of the invention.

DETAILED DESCRIPTION OF THE PREFERRED EMBODIMENT

Figure 1:
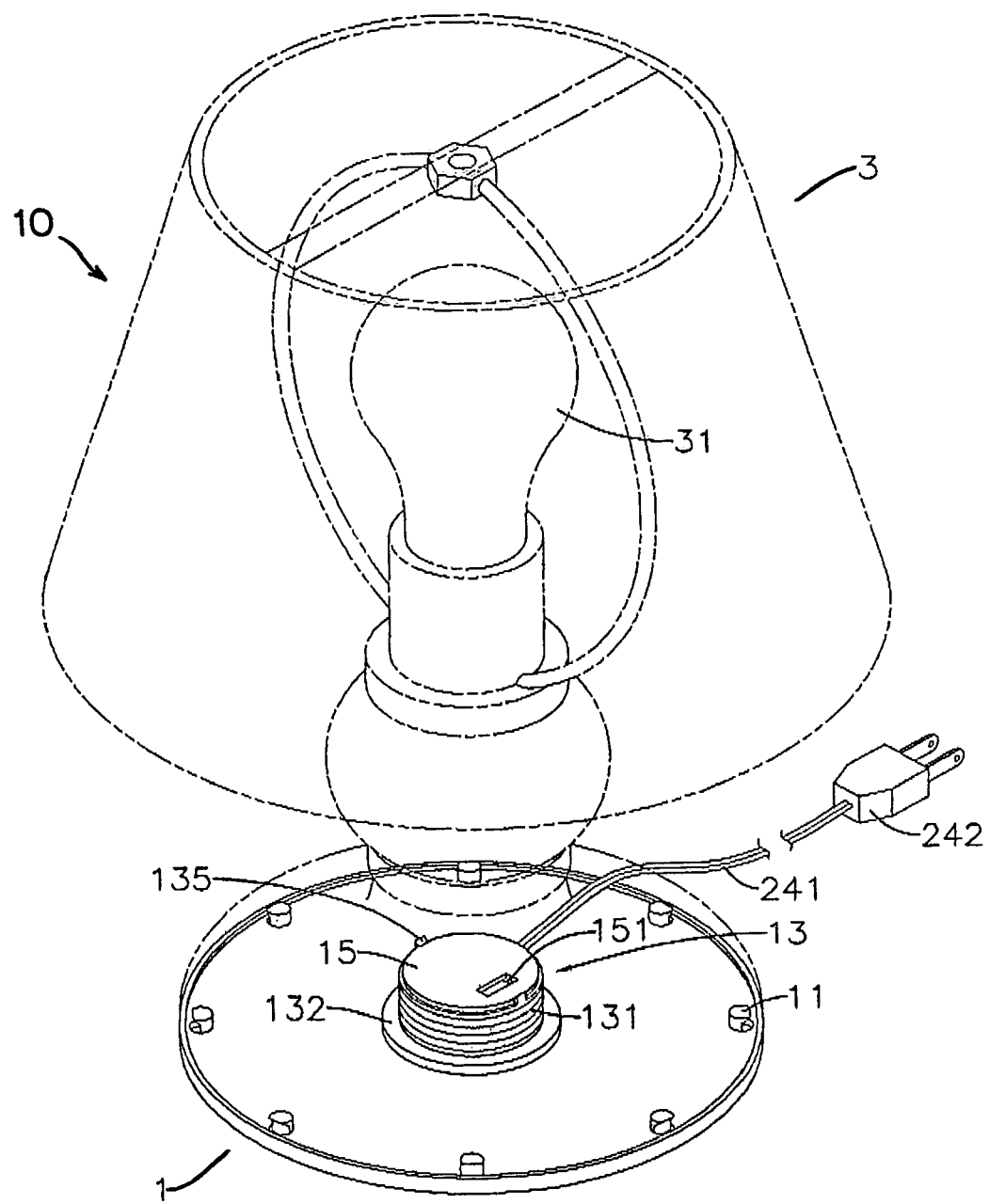
FIG. 1 is a perspective view of the tap sensing lamp according to the present invention.
Figure 2:
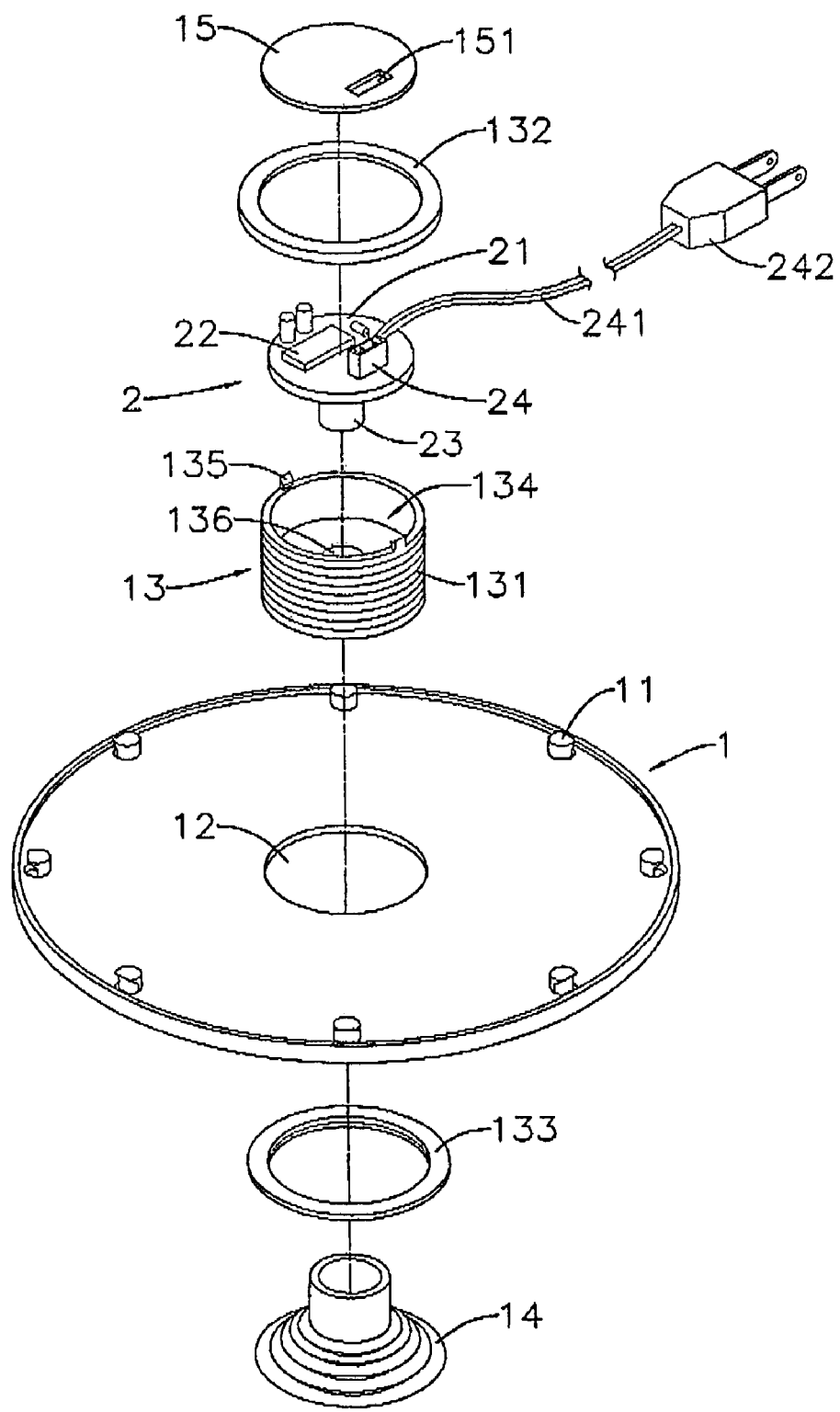
FIG. 2 is an exploded view in perspective of the lamp of FIG. 1 showing the respective components including the base, control unit and bellows cone device.
Figure 3:
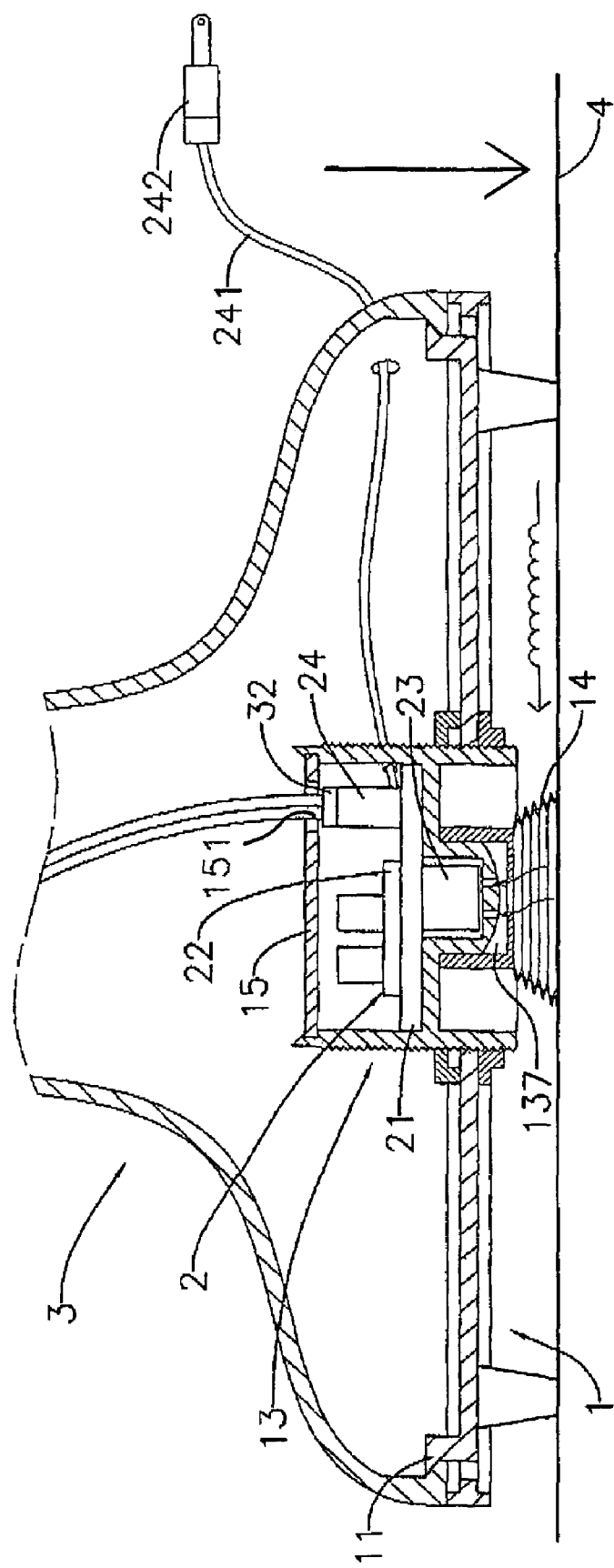
FIG. 3 is a partial cross-sectional view of the lamp in operation according to a first embodiment having short rubber feet supporting the base of the lamp and the correspondingly contracted bellows cone device ready to listen to a tapping sound.

FIGS. 1, 2 and 3 are respectively perspective view illustrations of the configuration of this novel lamp 10 with stand, its components, and cross-section in its operation. As the figures show, the invention is about improvement of the startup device of lamps. The lamp 10 consists of a base 1 and a control unit 2. Tapping on the surface 4 on which the lamp 10 is placed, users can turn on or off the illuminator or bulb 31 of the lamp 10.

The base 1 includes a fastening component 11, which can be used in assembly with the lamp stand 3. At the center of the base 1 is a through bore 12, in which a housing unit 13 is situated. The housing unit 13 is formed as an external thread component 131 for screw-connection with the through bore 12. And the external thread component 131 of the housing unit 13 is situated in conjunction with adjustable internal thread fasteners 132 and 133 on the opposite sides of the base 1 for adjustment of the height of the housing unit 13. Bottom end of the housing unit 13 is fitted with a sound-collecting element 14 that is in contact with the surface on which the lamp 10 is placed. This sound-collecting element 14 is a serpent tube or bellows cone device with its longitudinal length adjustable according to the height of the base 1 from the surface 4 between an extended height and a contracted height, which is depicted by FIG. 3.

In addition, the housing unit 13 has a control unit seating area 134, at the brim of which are fastening hooks 135 for fastening a cover 15 having a slot 151. The seating area 134 has a recess 136, which has a through bore 137 that receives the sound-collecting element 14.

The control unit 2 is situated within the housing unit 13. The control unit 2 includes a connected startup circuit 22 built on a circuit board 21, a reception element 23 and the power-supply component 24. The reception element 23 can serve as a microphone and cooperates with the sound-collecting element 14. The power-supply component 24 is registered with the slot 151 of the cover 15 mentioned above. The slot 151 allows connection between the power-supply component 24 and the illuminator 31 of the lamp stand 3 through a socket 32, and enables the power-supply component 24 to make connection with external power source through a wire 241 and a plug 242. Based on the aforementioned arrangement, a brand new startup device is constructed.

In operation of thus configured lamp as shown in FIG. 3, with the base 1 joined to the lamp stand 3 and the base 1 placed on its surface 4 such as normal table or desk, the sound-collecting element 14 will be in contact with the surface 4 listening to a tapping sound signal. If the user desires to turn on or off the light, all he/she needs to do is tapping the surface 4 or the lamp stand 3, so the sound-collecting element 14 will pick up signals of the tapping and transmit them to the reception unit 23. This allows the startup circuit 22 to receive a turn-on/turn-off signal and turn on/off the bulb 31. The number of tapping for turn-on/turn-off control, as well as control of the brightness level of the illuminator 31 through the number of tapping, may be determined by design of the startup circuit 22.

Figure 4:
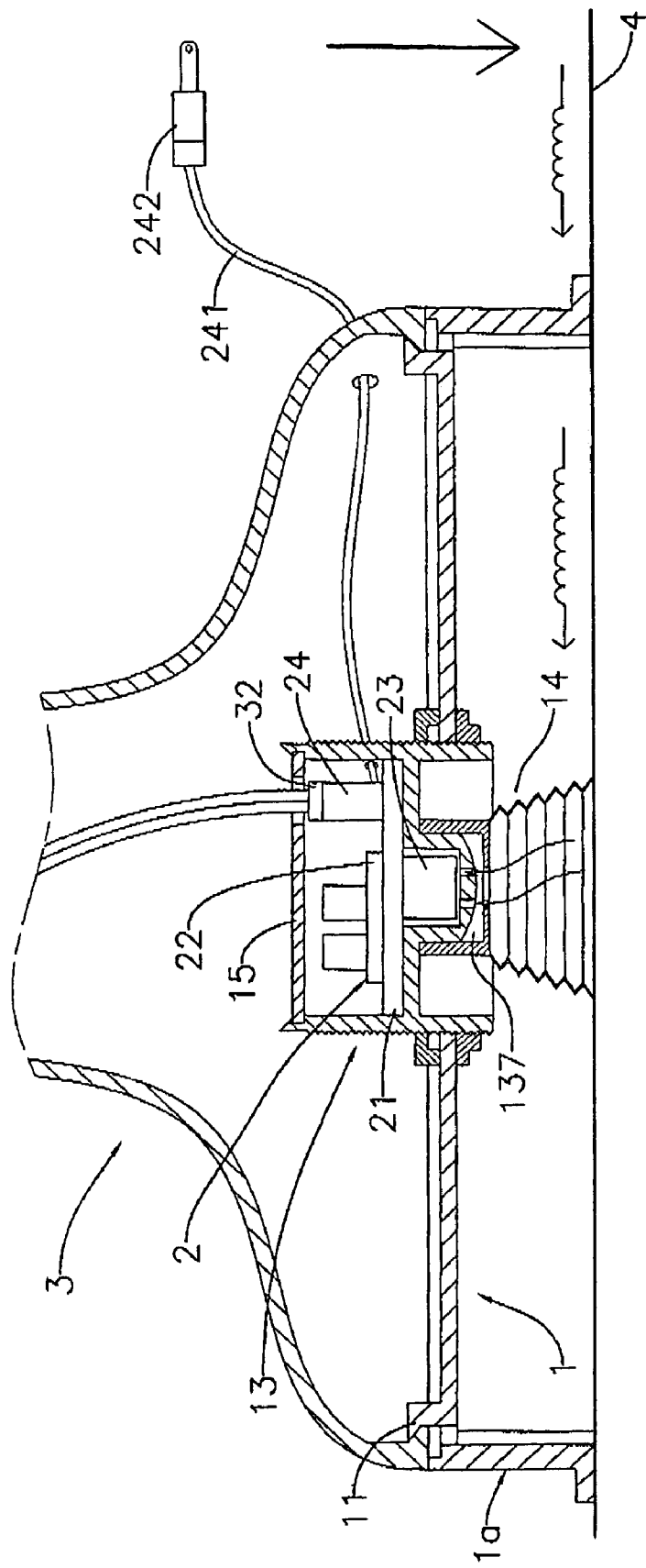
FIG. 4 is a partial cross-sectional view similar to FIG. 3 showing a second embodiment having a higher support at the base of the lamp and the corresponding extension of the bellows cone device to keep listening to the tapping on the table surface.

FIG. 4 shows another embodiment of the lamp according to the present invention. When a higher support 1a for the base 1 of the lamp 10 is employed, the user may simply extend the height of the sound-collecting element 14, which is a burrows cone, correspondingly allowing it to establish a constant contact with the surface 4 and assist in creating better tapping signals for the reception unit 23.

In sum, the improved startup structure of this unique lamp effectively removes shortcomings of conventional lamps, such as the frustration of not being able to find the switch, the danger of electrical shock, and the requirement that users need to come close to the lamp enough in order to access the switch.

This invention allows users to tap the lamp stand or the surface on which the lamp is placed, and the sound-collecting element in conjunction with the reception element will collect the signal of the tapping and switch on/off the startup circuit, so the illuminator of the lamp will be turned on/off. This arrangement avoids mistaken startup due to collection of other sounds. It makes the inventive lamp more advanced and practical and better meet users' need.

Above-mentioned are only better examples of the invention. They are not to serve as the basis for limiting the application scope of this device. Therefore, all changes and modifications made in accordance with the scope of this patent application and the content of this and other embodiments that attain the same effect shall be considered within the scope of the invention claimed as follows.

The invention claimed is:

1. A startup device for a lamp having a base, a stand coupled with said base and an illuminator connected to an electric power source, the improvement controls energization of said illuminator acoustically, comprising:

said base having a sound-collecting element mated with a housing unit so that said sound-collecting element has direct contact with the surface the lamp is placed on;

a control unit situated within said housing unit and including a connected startup circuit built on a circuit board, a reception element and a power-supply component, whereby said reception element cooperates with said sound-collecting element to switch said power-supply component allowing said illuminator to make or break connection with said power source upon receiving tapping sound at said stand or through said surface; wherein said reception element is a microphone.

2. The startup device set forth in claim 1, wherein the center of said base has a through bore and said housing unit is formed as an external thread component for screw-connection with said through bore and a couple of adjustable internal thread fasteners at the opposite sides of said base for adjustment of the height of said housing unit.

3. The startup device set forth in claim 1, wherein at the upper side of said base there are formed a fastening means for assembling said base with said lamp stand.

4. The startup device set forth in claim 1, wherein said housing unit has a control unit seating area, at the brim of which is a cover with a slot and said seating area having a recess, which has a through bore that connects with said sound-collecting element.

5. The startup device set forth in claim 4, wherein at the brim of said seating area are a number of fastening hooks for fastening said cover.

6. The startup device set forth in claim 1, wherein the sound-collecting element is a bellows cone of adjustable length.

7. An improvement of the startup structure of lamps, including:

a base that connects with a framework of said lamp and consisting of a housing unit, at one end of which is a sound-collecting element that has direct contact with the surface the lamp is placed on; and a control unit situated within said housing unit and including a connected startup circuit built on a circuit board, a reception element and a power-supply component, said reception element corresponding with said sound-collecting element and said power-supply component allowing an illuminator to make connection with an external power source upon receiving tapping sound at said framework or through said surface; wherein said reception element is a microphone.

8. The improved startup structure set forth in claim 7, wherein a through bore is formed at the center of said base and said housing unit is provided with an external thread component for screw-connection with said through bore and said external thread component of said housing unit is situated in conjunction with adjustable internal thread fasteners on two sides of said base for adjustment of the height of said housing unit.

9. The improved startup structure set forth in claim 7, wherein a fastening component is provided on the top of said base for assembling together with the lamp stand.

10. The improved startup structure set forth in claim 7, wherein said housing unit is provided with a placement zone, at the brim of which is a cover that is formed with a slot and said placement zone has a recess, which has a through bore that connects with said sound-collecting element.

11. The improved startup structure set forth in claim 7, wherein at the brim of said placement zone is a number of fastening hooks for fastening said cover.

12. The improved startup structure set forth in claim 7, wherein said sound-collecting element is a serpent tube of adjustable length.

* * * * *